United States Patent
Kumagai (10) Patent No.: US 8,463,989 B2
(45) Date of Patent: Jun. 11, 2013

(54) STORAGE DEVICE AND METHOD UTILIZING BOTH BLOCK I/O AND FILE I/O ACCESS

(75) Inventor: Atsuya Kumagai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 12/527,543

(22) PCT Filed: Jun. 16, 2009

(86) PCT No.: PCT/JP2009/002728
§ 371 (c)(1),
(2), (4) Date: Aug. 17, 2009

(87) PCT Pub. No.: WO2010/146626
PCT Pub. Date: Dec. 23, 2010

(65) Prior Publication Data
US 2012/0030423 A1    Feb. 2, 2012

(51) Int. Cl.
*G06F 13/38* (2006.01)
*G06F 12/00* (2006.01)

(52) U.S. Cl.
USPC .......................................... 711/112; 710/74

(58) Field of Classification Search
USPC .......................................... 711/112; 710/74
See application file for complete search history.

(56) References Cited

U.S. PATENT DOCUMENTS

| | | | |
|---|---|---|---|
| 6,493,804 B1 | 12/2002 | Soltis et al. | |
| 6,845,403 B2 * | 1/2005 | Chadalapaka | 710/5 |
| 2004/0030668 A1 * | 2/2004 | Pawlowski et al. | 707/1 |
| 2006/0149868 A1 | 7/2006 | Yamamoto | |
| 2007/0043737 A1 * | 2/2007 | Nagamatsu et al. | 707/10 |
| 2007/0061510 A1 * | 3/2007 | Kumagai et al. | 711/112 |
| 2007/0088880 A1 | 4/2007 | Kodama et al. | |
| 2007/0094539 A1 * | 4/2007 | Nakatsuka et al. | 714/38 |
| 2007/0282929 A1 * | 12/2007 | Kobayashi et al. | 707/204 |
| 2008/0082749 A1 * | 4/2008 | Kumagai | 711/114 |
| 2008/0115015 A1 * | 5/2008 | Ikezawa et al. | 714/42 |

FOREIGN PATENT DOCUMENTS

JP    2008-004120 A    1/2008

OTHER PUBLICATIONS

Preslan, K.W., et al., "Device Locks: Mutual Exclusion for Storage Area Networks", *16th IEEE Symposium on Mass Storage Systems*: 262-274, IEEE, San Diego, California, (1999).
Weber, R.O., "SCSI Primary Commands—3 (SPC-3)", *Project T10/1416-D Revision 23*, www.t10.org, (2005), 79 pgs.

* cited by examiner

*Primary Examiner* — Sanjiv Shah
*Assistant Examiner* — Glenn Gossage
(74) *Attorney, Agent, or Firm* — Foley & Lardner LLP (57) ABSTRACT

A storage device and method for ensuring the provision of data as complete files in a storage device capable of processing both block input/output I/O and file I/O. For each logical volume, an attempt is made to unmount logical units (LUs) storing files triggered by a session start request for block I/O (login request) such as iSCSI, and to recognize (mount) files of logical units triggered by a session completion request for block I/O (Logout request). Block access processing units may also create a replication of a specified logical unit and set a relevant replicated logical unit as a logical unit for access.

7 Claims, 5 Drawing Sheets

| User ID | Password | Initiator name | Target name | LUN | Block session | File session | Mount |
|---|---|---|---|---|---|---|---|
| 0001 | abcd | iqn.initiator.0001 | iqn.target.0001 | 0 | 0 | 1 | 1 |
| 0002 | | iqn.initiator.0002 | iqn.target.0002 | 1 | 1 | 0 | 0 |
| 0003 | | iqn.initiator.0003 | iqn.target.0003 | 2 | 0 | 0 | 1 |
| 0004 | | iqn.initiator.0004 | iqn.target.0004 | 3 | 0 | 1 | 1 |

STORAGE DEVICE AND METHOD UTILIZING BOTH BLOCK I/O AND FILE I/O ACCESS

TECHNICAL FIELD

This invention relates to a storage device, a controlling method for the same, and programs, for example, for providing file services in a storage device.

BACKGROUND ART

Generally, there are two types of input/output methods from a host computer to a storage device, input/output (I/O) per block (block I/O) and I/O per file (file I/O). The storage devices which can accept the latter type are called file storages, network attached storage (NAS) or others. Recently, storage devices including both an interface for block I/O and an interface for file I/O have spread, and specifically, technology capable of processing both block I/O requests and file I/O requests for a single logical volume is suggested (refer to the Patent Document 1 for an example).

CITATION LIST PATENT

Literature

Patent Document 1: Japanese Patent Publication (Kokai) No. 2008-4120

SUMMARY OF INVENTION

Technical Problem

It should also be noted that the storage device must recognize the data in the logical volume as a file for accepting and processing file I/O requests.

However, in the conventional storage device as disclosed in the Patent Document 1, the data recognized as a file by the host computer are fragmented into a number of blocks when being written in the form of the block I/O for the storage device. Therefore, when trying to recognize the data in the logical volume in which the block I/O is in process as a file at an arbitrary point of time, there might be problems including a case in which a storage device results in providing a "broken file" which cannot be utilized by the applications in the host computer. This is because the device cannot correctly recognize a file by the processing per block. Therefore, by the storage device as in Patent Document 1, it is impossible to ascertain when to mount a file and allow access as a file.

Therefore, in that case the host computer using the logical volume is required to complete a series of input/output operations (specifically complete writing the data to be written) as a file by unmounting or other processing, and then report it to the storage device, but no appropriate method for it has been established yet.

In view of the above-mentioned situation, the present invention ensures the provision of data as a complete file in a storage device capable of processing both block I/O and file I/O.

Solution to Problem

An example of standards for realizing block I/O is small computer systems interface (SCSI). The SCSI itself does not provide the host computer with any means for and reporting the completion of the write to the file and the unmounting of the logical volume to the storage device. Therefore, it is generally difficult for the storage device with the SCSI interface to independently recognize the data written by the block I/O as a file.

However, if iSCSI is used as the communication means of the SCSI command, the iSCSI standard includes the operations of starting and completing a session. As the iSCSI session is established between both ends, (the computer and the storage), the storage might be able to use it as the timing for recognizing the file. That is because, in the normal use of the computer in which the iSCSI storage is used as a storage device, the iSCSI session is started after the power is turned on (iSCSI login), and the iSCSI session is completed before the power is turned off (iSCSI logout).

Considering these points for solving the above-mentioned problems, in each logical volume an attempt is made to unmount logical units (LUs) storing files triggered by a session start request for block I/O (login request) such as iSCSI, and to recognize (mount) files of the logical units triggered by a session completion request for block I/O (logout request).

As more specifically described, in this invention, the storage device (100) includes communication units (106) for communicating with a host computer (110), block access processing units (201, 101) for processing block access requests from the host computer (110), and disk devices (105) comprising multiple logical units. The block access processing units (201, 101), in response to a login request for block access (iSCSI Login Request Protocol Data Unit (PDU)) from the host computer (110) received by the communication unit (106), specify the logical unit as the access target, unmount the relevant specified logical unit, and perform the block access processing (file write processing per block). Note that the block access processing units (201, 101) prohibit any file access to the specified logical unit during the block access processing. As more specifically described, the storage device (100) further includes a session management table (203) for managing user identifications (IDs) (301), logical units (305) accessible by the relevant user IDs, information (306) about the presence or absence of block accesses to the relevant logical units (305), and information (307) about whether file accesses to the relevant logical units are possible. Furthermore, during the block access processing, the block access processing units (201, 101) prohibit any file access to the logical unit specified by the session management table (203) by setting such file access to "DENIED."

If the communication unit (106) receives a logout request for block access (iSCSI Logout Request PDU) from the host computer (110), the block access processing units (201, 101) mount the specified logical unit and set files in the mounted logical unit to be accessible. As more specifically described, the block access processing units (201, 101) complete the block access processing, and then confirm whether the files written by the block access processing can be mounted or not. If they are determined to be mountable, the block access processing units (201, 101) actually mount the specified logical unit and set files in the mounted logical unit to be accessible.

Another aspect is that, if the communication unit (106) receives a block access logout request (iSCSI Logout Request PDU) from the host computer (110), the block access processing units (201, 101) create a replication of the specified logical unit, and set the relevant replicated logical unit as the logical unit for file access. As more specifically described, the block access processing units (201, 101) complete the block access processing, and then confirm whether the files written by the block access processing can be mounted or not. If they are determined to be mountable, the block access processing units (201, 101) create a replication of the specified logical unit, and set the relevant replicated logical unit as the logical unit for file access.

Further characteristics of this invention are disclosed by the following embodiments for realizing this invention and the attached figures.

Advantageous Effects of Invention

By this invention, if a session for block I/O is established, accesses to the file related to the relevant session are prohibited, and a session for file I/O is allowed to perform after the session for block I/O is completed, which ensures providing data as a complete file. That is, the provision of a broken file can be prevented.

It also becomes possible to provide various types of services as files while the session for block I/O is not established yet.

DESCRIPTION OF EMBODIMENTS

The embodiments of this invention are described below with reference to the attached figures. However, it should be noted that these embodiments are merely examples for achieving this invention and the technical scope of this invention is not limited to these examples. Note that the same reference numeral is added to each of the common configurations in the attached figures.

(I) First Embodiment

The first embodiment describes the operation example in which the storage device dynamically switches the method of accessing logical units (LUs) between block access and file access.

System Configuration

Figure 1:
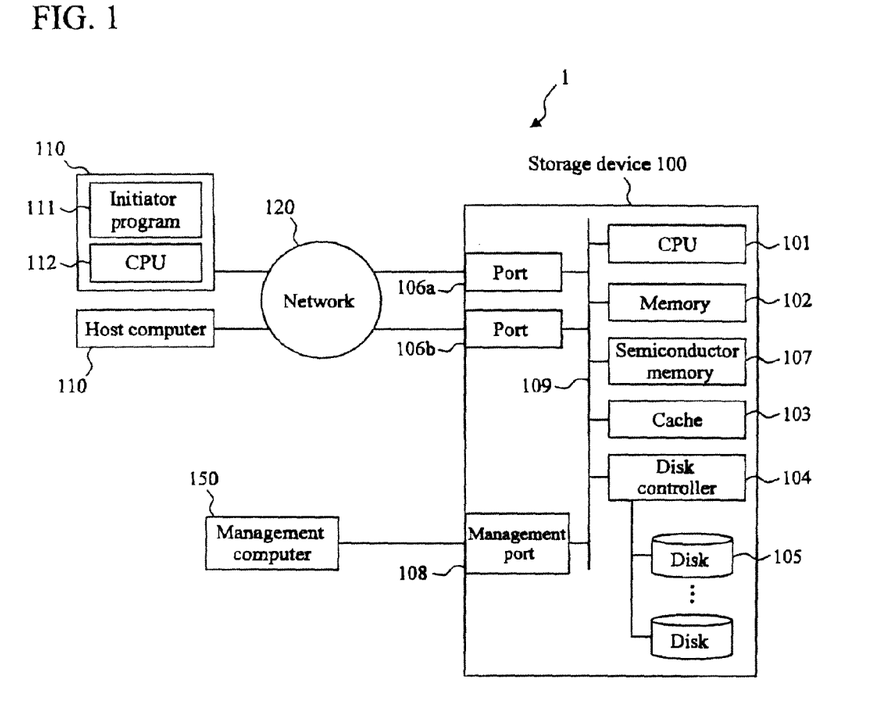
FIG. 1 is a diagram showing a configuration overview of the storage system according to this invention.

FIG. 1 is a diagram showing the configuration overview of a storage system according to a first embodiment of this invention. As shown in FIG. 1, a storage system 1 includes a storage device 100, multiple host computers 110, and a management computer 150 connected with the storage device 100. The storage device 100 and the host computers 110 are connected with each other via a network 120 such as the Internet or an Intranet.

The host computer 110 is an information processing device for executing applications including data input/output, and includes an initiator program 111 for accessing the storage device 100 and a host CPU (Central Processing Unit) 112 for executing the initiator program 111. This initiator program 111 defines an initiator (virtual object) capable of providing a target (virtual object) and a block session by the iSCSI protocol defined by a target program 201 to be described later.

The storage device 100 includes a storage CPU 101 (controlling unit), a memory 102, a cache memory 103 for accelerating accesses, a disk controller 104, one or more disks 105, ports 106a, 106b (hereinafter collectively referred to as ports 106), a semiconductor memory 107 including a flash memory and others, a management port 108, and a bus 109 for connecting these components.

The storage CPU 101 performs the various types of processing described later by executing the target program 201 (described later) stored in the memory 102.

The memory 102 is the device for storing the target program 201 (described later) and data.

The cache memory 103 is a device for temporarily storing written data.

The disk controller 104 is a device for controlling data input/output to/from the disks 105. Note that the disk controller 104 may also be permitted to perform the processing corresponding with RAID (Redundant Array of Independent Disks).

The disk 105 is a device for storing the data read or written by the host computer 110.

The port 106 is a device such as a network card for connecting a LAN (local area network) cable with the storage device 100, and performs data transmission and receipt. Note that this embodiment specifies that the storage device 100 includes two ports 106a and 106b, but three or more ports 106 can be included.

The semiconductor memory 107 is a device for storing the programs and the data read to the memory 102 when starting up the storage device 100.

The management port 108 is a device for connecting the storage device 100 with the management computer 150.

The management computer 150 is a computer for performing the setting for the storage device 100 via the management port 108 of the storage device 100.

Internal Configuration of Memory 102

Figure 2:
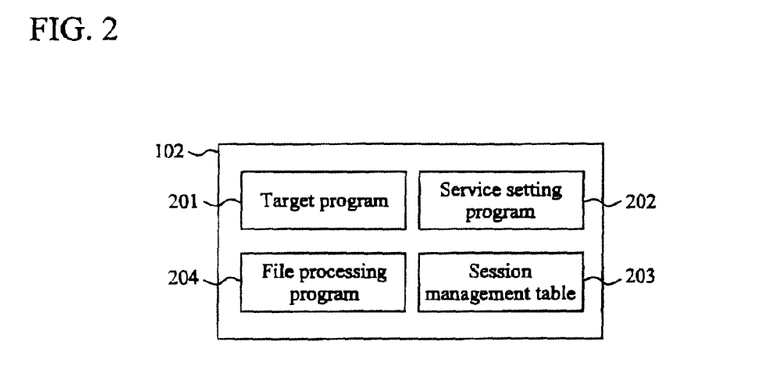
FIG. 2 is a diagram showing the internal configuration of the memory 102.

FIG. 2 is a diagram showing the programs and the data stored in the memory 102 of the storage device 100 (refer to FIG. 1 as needed).

The memory 102 stores a target program 201, a service setting program 202, a session management table 203, and a file processing program 204.

The target program 201 is the program for exchanging the iSCSI PDU (Protocol Data Unit) with reference to the iSCSI standard with the initiator program 111 operating in the host computer 110. That is, the target program 201 operates following the iSCSI protocol, provides a session with the initiator program 111 of the host computer 110, and performs the conversion of the data in accordance with a SCSI command and other processing in response to the requests from the host computer 110. The target program 201, as described later, mounts or unmounts the LUs managed by the session management table 203, depending on the situation.

The service setting program 202 is the program for setting the services required by the user of the host computer 110 as file services. Examples of the services include the backup service and virus scan, for example, the services such as performing the backup if the iSCSI session is disconnected or performing the backup processing triggered by logout are available.

The session management table 203 is the table allocated to the users identified by user IDs for managing the initiator program 111, the target program 201, the correspondence of LUs and the session status. The details of this table are described later with reference to FIG. 3.

The file processing program 204 is the program for providing files in response to the file requests from the host computer 110 and making the storage device 100 operate as the file server.

Note that each of the programs operates as a processing unit in collaboration with the CPU 101. For example, the target program 201 comprises the target processing unit 201 in collaboration with the CPU 101.

Examples of Session Management Table

Figure 3:
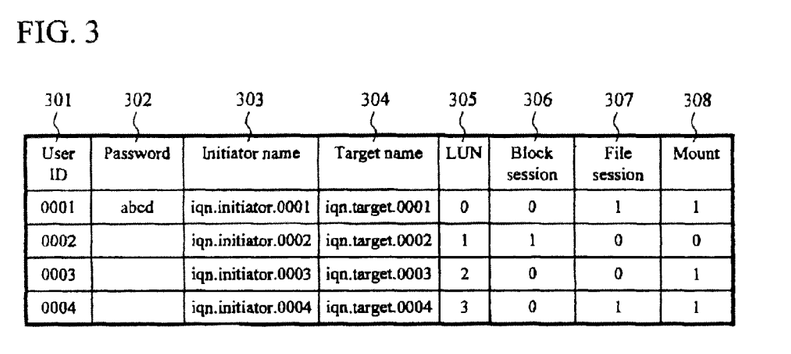
FIG. 3 is a diagram showing a configuration example of the session management table.

FIG. 3 is a diagram showing an example of the session management table 203.

The session management table 203 is a table comprised of the "user ID" field 301, the "password" field 302, the "initiator name" field 303, the "target name" field 304, the "LUN" (logical unit number) field 305, the "block session" field 306, the "file session" field 307, and the mount field 308.

The "user ID" field 301 stores the IDs for identifying the users.

The "password" field 302 stores the passwords for authenticating the users.

The "initiator name" field 303 stores the names for identifying the iSCSI initiators of the host computer 110. Note that the initiator program 111 virtually defines the initiators available to the users. The users are assumed to perform sessions with the targets by using these initiators. Furthermore, the initiator program 111 can specify multiple initiators available to each user.

The "target name" field 304 stores the names for identifying iSCSI targets. Note that the target program 201 defines the targets as the end point of performing sessions with the initiators. Multiple targets can also be specified for each user. The initiator name 303 and the target name 304 determine the combinations which can perform sessions.

The "LUN" field 305 stores the numbers for identifying the LU allocated to each host computer 110. This allows the users to define the accessible LUs. Note that it may also be permitted to input the LU numbers not allocated to any of the host computers 110 in the "LUN" field 305.

The "block session" field 306 stores the value "1" if the iSCSI session is established between the iSCSI initiator and the iSCSI target, or stores the value "0" if it is not established.

The "file session" field 307 stores the value "1" if each user is allowed to access the file, or stores the value "0" if not allowed.

The "mount" field 308 stores the value "1" if the LU is mounted, or stores the value "0" if the LU is not mounted.

If the "block session" field 306 is "1," the "file session" field 307 must be "0." This is for the purpose of denying file access during the block write.

For example, if the fields 307 and 308 are "0" and "1," the file is mounted, but the user has not logged in for file access. In such a status, for example, a backup and search index can be created. Similarly, if the fields 306 to 308 are "0," "1," and "1," no block session is provided, the user has logged in for file access, and the file is mounted (i.e. it is readable).

Processing of File Processing Program

Figure 4:
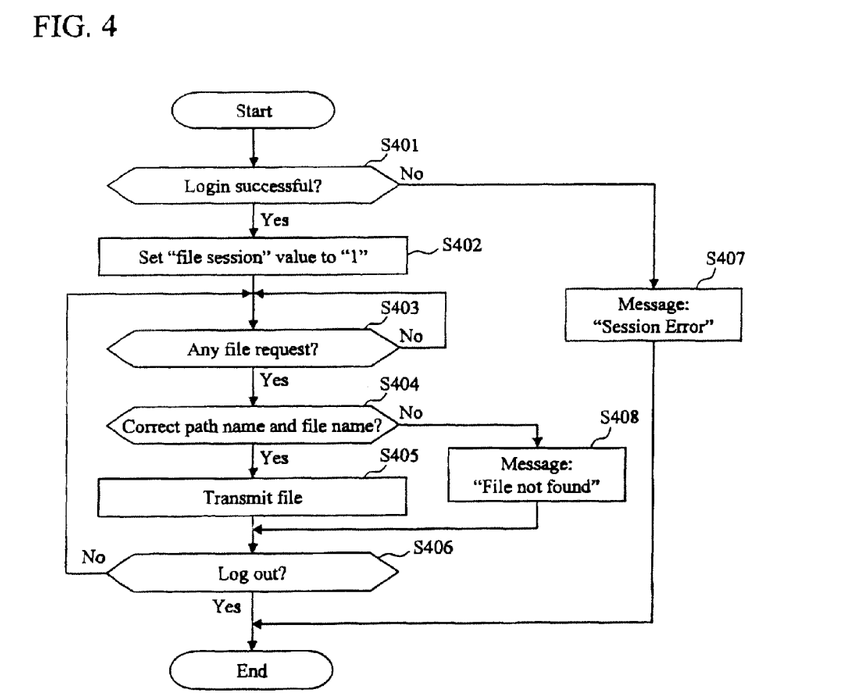
FIG. 4 is a flowchart showing the processing performed with reference to the file processing program.

FIG. 4 is a flowchart showing the processing performed by the file processing program 204 if the storage CPU 101 receives a file request message (read request) from the host computer 110.

Firstly, the storage CPU 101, with reference to the file processing program 204, determines whether the user login (login as a file access e.g. login by using a browser) is successful (step S401). If the login is successful, the processing proceeds to step S402. If the login is not successful, the CPU 101 transmits the "Session Error" message to the host computer 110 (step S407), and completes the processing. Note that whether the user login is successful or not is determined according to whether the combination of the input user ID and the password exists, and it is also determined by checking whether the "block session" field 306 is "0" or "1" in the session management table. That is, if the "block session" field 306 is "1," a block session is currently provided, and the file access is prohibited, becoming "Session Error." (step S407).

At the step S402, the CPU 101 follows the file processing program 204 and sets the "file session" value of the session management table 203 to "1." That is, the storage CPU 101, when receiving the file session establishment request, determines whether the combination of the user ID and the password included in the file session establishment request is registered in the session management table, and if it is registered, the "file session" value of the session management table 203 is set to "1." If not registered, the "file session" value of the session management table 203 is set to "0."

Next, the CPU 101 waits until the host computer 110 issues a file read request (step S403). If a file request is issued, the CPU 101 obtains the file path name and the file name included in the file read request, and determines whether there is a file identified by those names (step S404).

If the identified file exists, the CPU 101 transmits the relevant file to the host computer 110 of the file request source (step S405). If no file identified by the relevant path name and file name exists, the CPU 101 transmits the "File not found" message to the host computer 110 of the file request source (step S408), and the processing proceeds to the step S406.

The CPU 101, if the user does not log out (step S406), continues to wait for a file request (step S403). Note that, though not shown in the figure, the file access processing is completed if the user logs out while the CPU 101 waits for the file request.

Processing at the Time of Login by Target Program

Figure 5:
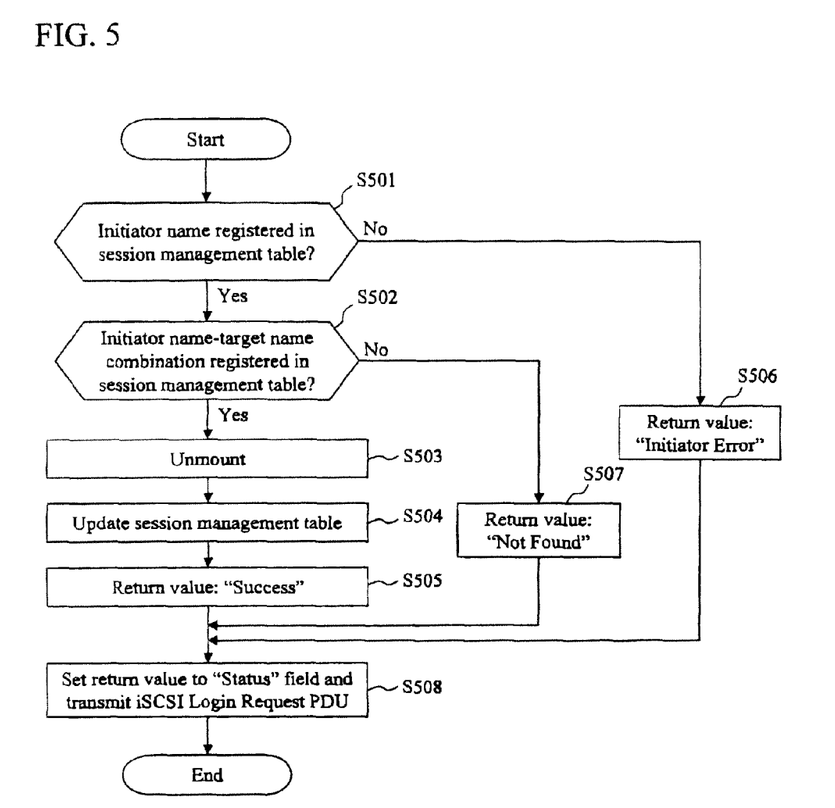
FIG. 5 is a flowchart showing the login processing for block access with reference to the target program.

FIG. 5 is a flowchart showing the processing with reference to the target program 201 when the storage CPU 101 receives an iSCSI Login Request PDU for a normal session. The storage CPU 101 obtains the value of the "Initiator Name" field (hereinafter referred to as an "initiator name") and the value of the "Target Name" field (hereinafter referred to as a "target name") included in the iSCSI Login Request PDU and performs the following processing.

Firstly, the CPU 101, with reference to the target program 201, determines whether the initiator name included in the PDU is registered in the session management table 203 (step S501). The processing proceeds to the step S502 if the initiator name is registered in the session management table 203, or to the step S506 if not registered.

At the step S502 (as "YES" at the step S501), the CPU 101 refers to the session management table 203, and determines whether the combination of the initiator name and the target name is registered in the session management table 203. The processing proceeds to the step S503 if it is registered (as "YES" at the step S502), or to the step S507 if not registered (as "NO" at the step S502).

If registered ("YES" at step S502), the CPU 101 unmounts the LUs allocated to the initiator name and the target name (step S503), changes the value of the "block session" field in the session management table to "1," changes the value of the "mount" field in the session management table to "0" (step S504), and sets the return value to "Success" (step S505).

Meanwhile, at the step S501, if the storage CPU 101 determines that the initiator name is not registered in the session management table 203 ("NO" at the step S501), it sets the return value to "Initiator Error" (step S506). At the step S502, if the storage CPU 101 determines that the combination of the initiator name and the target name is not registered in the session management table 203 ("NO" at the step S502), it sets the return value to "Not Found" (step S507).

Finally, as a response to the iSCSI Login Request PDU, the storage CPU 101 transmits the iSCSI Login Response PDU with the determined return value set in the "Status" field to the host computer 110 (step S508).

As described above, if a login for block access is performed and the relevant login is appropriate, the relevant LU is unmounted, and in this LU, the file write processing per block is allowed to perform.

Processing at the Time of Logout by Target Program

Figure 6:
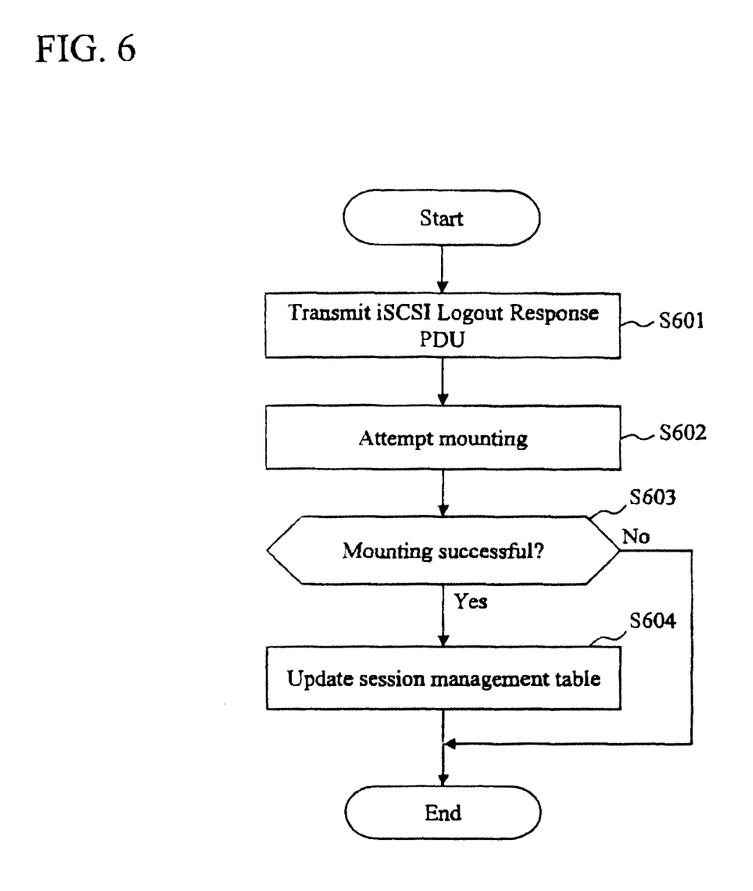
FIG. 6 is a flowchart showing the logout processing for block access with reference to the target program in a first embodiment.

FIG. 6 is a flowchart showing the processing with reference to the target program 201 when the storage CPU 101 receives an iSCSI Logout Request PDU for a normal session. Note that the possible causes of logout include, as well as the logout by the user, for example, the case in which a significant amount of packet loss has occurred and the iSCSI session must be temporarily disconnected.

Firstly, the storage CPU 101, when receiving an iSCSI Logout Request PDU request from the host computer 110, transmits an iSCSI Logout Response PDU to the host computer 110 as a response to this iSCSI Logout Request PDU (step S601).

Next, the storage CPU 101 attempts to mount the LU which is the target of the logout request and is associated with the iSCSI session (step S602). Since logout does not necessarily ensure that the relevant LU can be mounted, this processing is intended for checking whether the LU including the file written in the block access immediately before the logout can be mounted. For example, as mentioned above, if a significant amount of packet loss has occurred and the temporary logout is performed, the relevant session must be disconnected even if the block write processing is in process. In such a case, the file in the middle of the write cannot necessarily be mounted as a complete file. Therefore, it is necessary to check whether the written file can be mounted by attempting to mount it. Note that, if the block session is disconnected in the middle of the process, it is supposed that a new iSCSI block session is provided and the block write processing is resumed.

Then, the CPU 101 determines whether the mounting is successful (step S603). Whether the mounting is successful can be determined by checking whether the directory configuration for the relevant file included in the relevant LU is made in the relevant file, or whether the relevant written file is available to the related application programs.

If the mounting is successful ("YES" at the step S603), the CPU 101 follows the target program 201, changes the value of the "block session" field in the session management table to "0," and changes the value of the "mount" field in the session management table to "1" (step S604 in the session management table). If the mounting is unsuccessful ("NO" at the step S603), the processing is completed.

As described above, file read is made possible after write per block is completed. By this method, if there is any access to the file during the block access, the access to the file in the write processing is prohibited, and the risk of providing a broken file can be prevented.

Furthermore, by this method, the storage device 100 can operate as a file server for the host computer 110 when an iSCSI session is not established, and even mobile devices and other devices which do not have the iSCSI initiator function can access files using common browsers and others.

Note that, though the above-mentioned operation is described assuming that the file access by the host computer 110 only performs downloading (read), uploading and deleting can also be performed as shown below. That is, for enabling, deleting and uploading, an exclusive control program with an uploading function must be installed in the host computer 110. If the user of the host computer 110 performs the uploading or deleting of the file following this exclusive control program, the CPU 112 transmits an iSCSI Logout Request PDU (message) to the storage device 100. Next, when receiving the iSCSI Logout Response PDU (message) from the storage device 100, the CPU 112 of the host computer 110 transmits the file or the deletion request message to the storage device 100. The storage device 100 writes the received file to the LU or deletes the specified file. Then, the CPU 112, following the exclusive control program, transmits the iSCSI Login Request PDU (message) to the storage device 100, and reestablishes the iSCSI session.

(2) Second Embodiment

The second embodiment relates to a system for enabling reference to the files in the storage device 100 even if the block session is established.

System Configuration and Internal Configuration of Memory

The configuration of the storage system in accordance with the second embodiment is the same as in FIG. 1 referred to when describing the first embodiment.

The programs and the data stored in the memory 102 of the storage device 100 are also the same as those in the first embodiment (FIG. 2). Furthermore, the session management table stored in the memory 102 is the same as that in the first embodiment (FIG. 3).

Processing of File Processing Program

As in the first embodiment, by the file processing program 204, the storage CPU 101, when receiving a file session establishment request from the host computer 110, determines whether the combination of the user ID and the password included in the file session establishment request is registered in the session management table. If it is registered, the CPU 101 sets the "file session" value of the session management table 203 to "1." If not registered, the "file session" value of the session management table 203 is set to "0."

Note that, though the block I/O and the file I/O are performed for the same LU in the first embodiment, this embodiment provides the LUs for block I/O and the file I/O separately. That is, the flowchart showing the processing performed by the CPU 101 following the file processing program 204 when receiving the file request message is the same as FIG. 4, the file read at this time is performed from the LU for file I/O.

Processing of Target Program

The processing when receiving an iSCSI Login Request PDU is the same as that in FIG. 5. This embodiment is different from FIG. 6 in the processing when receiving an iSCSI Logout Request PDU.

Figure 7:
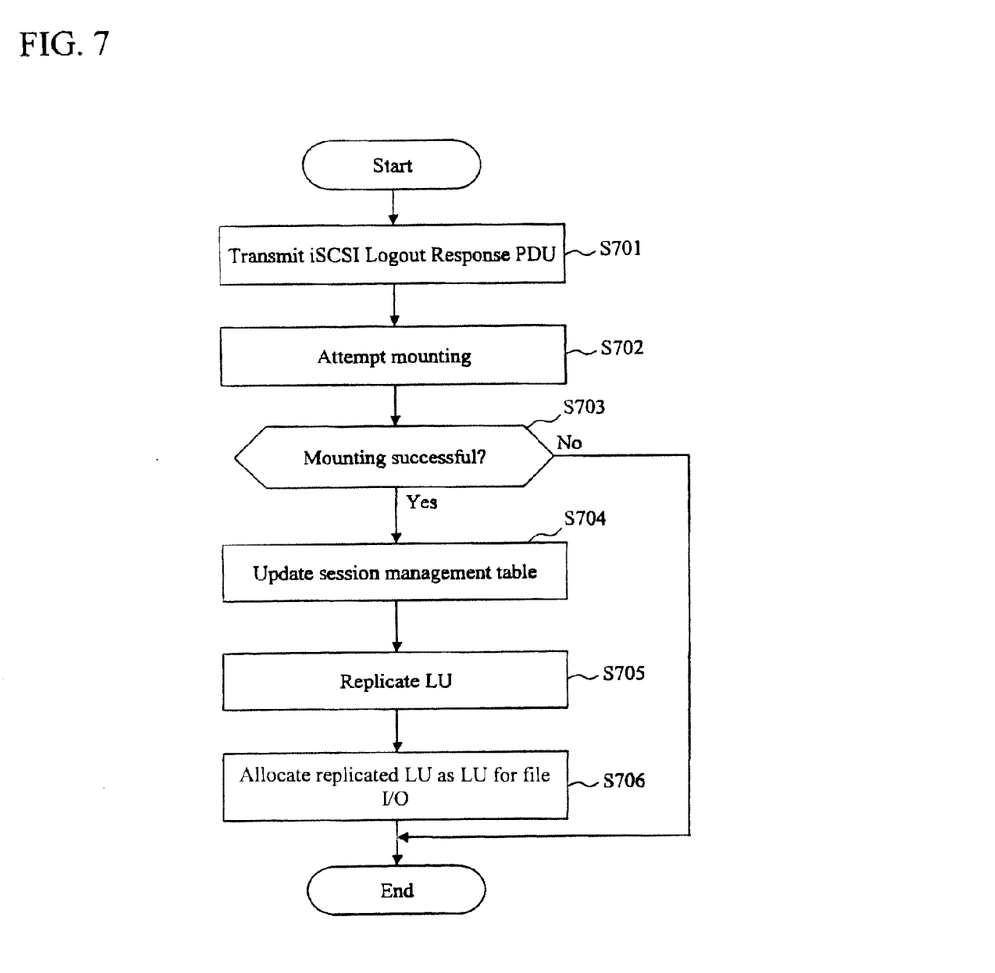
FIG. 7 is a flowchart showing the logout processing for block access with reference to the target program in a second embodiment.

FIG. 7 is a flowchart showing the processing with reference to the target program 201 when the storage CPU 101 receives an iSCSI Logout Request PDU for a normal session.

Firstly, the storage CPU 101, in response to the iSCSI Logout Request PDU, transmits an iSCSI Login Response PDU to the host computer 110 (step S701).

Next, the storage CPU 101 attempts to mount the LU which is the target of the logout request and is associated with the iSCSI session (step S702). This processing is the same as the above-mentioned step 602.

Then, the CPU 101 determines whether the mounting is successful (step S703). In this case as well, whether the mounting is successful can be determined by checking whether the directory configuration is made in the relevant file included in the relevant LU, or whether the relevant written file is available to the related application programs.

If the mounting is successful ("YES" at the step S703), the CPU 101 follows the target program 201, changes the value of the "block session" field in the session management table to "0," and changes the value of the "mount" field in the session management table to "1" (step S704). If the mounting is unsuccessful ("NO" at the step S703), the processing is completed.

Next, the storage CPU 101 creates a replication of the LU which is the target of the logout request and is associated with the iSCSI session (step S705). The CPU 101 allocates the replicated LU newly as an LU for file I/O (step S706), and after this, if it receives a file request message, it follows the file processing program 204 and performs the file read processing from the LU (replicated LU) newly allocated as an LU for file I/O.

As described above, the user of the host computer 110 can refer to the files in the storage device 100 even when the block session is established.

(3) Other Embodiments (Variations)

(i) In the first and second embodiments, file access is the only service provided by the storage device 100, but the storage device 100 can provide other types of file services, and the user can set the desired file services.

For example, the file processing program 204 accepts file service related settings with reference to hypertext transfer protocol (HTTP) access from the host computer 110. The storage device 100 provides, as well as the file access described in the first embodiment, services such as file sharing, virus scan, and search index creation. The user of the host computer 110 can specify whether to use each of these services or not by using a browser.

By this method, the storage device 100 can provide various file services while the block session is not established yet.

(ii) Furthermore, in the first embodiment, the host computer 110 can upload or delete the files of the storage device 100, but the user of the host computer 110 or the administrator of the storage device 100 may also be permitted to specify a status in which these operations are not allowed (read only).

In this case, the user of the host computer 110 or the administrator of the storage device 100 performs the setting of whether to specify read only using the file processing program 204. With reference to this setting, when receiving a request for uploading or deleting the LU for which read only is set to "YES," the storage device 100 operates to deny the request.

By this method, the file uploading or deletion unintended by the user of the host computer 110 or other operational errors can be prevented.

(4) Conclusion

This invention can be broadly applied to a storage system including one or multiple devices and other types of storage systems.

As described above, in each logical volume, an attempt is made to unmount logical units (LUs) storing files triggered by a session start request for block I/O (login request) such as iSCSI, and to recognize (mount) files of the logical units triggered by a session completion request for block I/O (logout request). This can completely separate sessions for block I/O and for file I/O, and prohibit accesses to the files related to the sessions for block I/O. Therefore, a session for file I/O can be prevented from starting during a block session, and the risk of providing a broken file can be removed. Furthermore, after a session for block I/O is completed, the appropriate file service can be provided.

If the device receives a logout request for the block session (iSCSI Logout Request PDU) from the host computer, after completing the block session, the CPU of the storage device checks whether the file written during the block session can be mounted or not using the target program. If the file is determined to be mountable, the logical unit unmounted during the block session is actually mounted and is set accessible. As described above, the mounting is tested because logout does not necessarily ensure that the file has completed the write processing and the mounting is unsuccessful in some cases. This method ensures that the file is mounted only if the block session is appropriately completed and appropriate file services are provided.

Furthermore, the aspect of providing the replication of the target logical unit as a logical unit for file access is considered. That is, if the device receives a logout request for the block session (iSCSI Logout Request PDU) from the host computer, after completing the block session, the CPU of the storage device checks whether the file written during the block session can be mounted or not by using the target program. If the file is determined to be mountable, a replication of the target logical unit is created, and the relevant replicated logical unit is set as a logical unit for file access. By this method, with the replicated logical unit, even if the block session for the replication source logical unit is in process, the relevant logical unit can be provided as a file system.

Note that, this invention may also be achieved by programming codes of software which achieves the functions in the above-mentioned embodiment. In this case, the storage media recording the programming codes is provided to a system (or a device), and the computer (or a CPU or microprocessor unit (MPU)) of the system (or device) reads the programming codes stored in the storage media. In this case, the programming codes read from the storage media themselves achieve the functions in the above-mentioned embodiment, and the programming codes themselves and the storage media which store them are considered to be a part of this invention. The storage media to provide such programming codes are, for example, flexible disks, compact disc read only memories (CD-ROMs), digital versatile disc-read only memories (DVD-ROMs), hard disks, optical disks, magnetic optical disks, compact disc recordables (CD-Rs), magnetic tapes, nonvolatile memory cards, and read only memories (ROMs).

Furthermore, it may be permitted that the OS (Operating System) or others operating in the computer, with reference to the commands of the programming codes, perform all or part of the actual processing, and by that processing, the functions in the above-mentioned embodiments are achieved. Furthermore, another method may also be permitted that, after the programming codes read from the storage media have been written in the memory of the computer, with reference to the commands of the programming codes, the CPU or others of the computer perform all or part of the actual processing, and by that processing, the functions in the above-mentioned embodiment are achieved.

Furthermore, another method may also be permitted in which, by distributing via the network, the programming codes of the software which achieve the functions in the above-mentioned embodiments, are stored in the storage means in the system or the device such as hard disks and memories, or the storage media such as compact disc readwritables (CD-RWs) and CD-Rs, and when using the system, the computer (or the CPU or the MPU) of the system or the device reads the programming codes stored in the relevant storage and executes them.

REFERENCE SIGNS LIST

1 Storage system
100 Storage device
101 CPU
102 Memory
103 Cache memory
104 Disk controller
105 Disk
106 Port
107 Semiconductor memory
108 Management port
109 Bus
110 Host computer
111 Initiator program
112 CPU
120 Network
150 Management computer

The invention claimed is:

1. A storage device comprising:
   a communication port configured to communicate with a host computer;
   a block access processing unit configured to process a block access request which is an input request per block from the host computer;
   disk devices comprising multiple logical units; and
   a memory configured to store session management information, including: (i) first information which indicates user IDs for identifying users of the host computer, (ii) second information which indicates logical units accessible by users identified by one of the user IDs, (iii) third information which indicates whether an iSCSI session corresponding to the logical units is established, (iv) fourth information which indicates whether file accesses to the logical units are possible by the user identified by the one of the user IDs, and (v) fifth information which indicates whether the logical units are already mounted, wherein
      when the communication port receives a login request for block access according to the iSCSI protocol from the host computer, the block access processing unit is configured to use the session management information to specify a logical unit as an access target, to unmount the specified logical unit, to set the third information to a value indicating that the iSCSI session has been established, to set the fifth information to a value indicating that the specified logical unit is not mounted, and to perform block access processing,
      when the communication port receives a logout request for block access according to the iSCSI protocol from the host computer, the block access processing unit is configured to determine whether a mount operation has been successfully completed by attempting to mount the specified logical unit including a file written by the block access processing,
      if the mount operation has been successfully completed, the block access processing unit is configured to change the third information to a value indicating that the iSCSI session has not been established and to change the fifth information to a value indicating that the specified logical unit is mounted to put the specified logical unit in a state where file access is possible, and,
      if the mount operation has not been successfully completed, the block access processing unit is configured not to change the values of the third and fifth information.

2. The storage device according to claim 1, wherein
   when the communication port receives a logout request for block access according to the iSCSI protocol from the host computer, the block access processing unit is configured to complete the block access processing, and then to determine whether a mount operation has been successfully completed by attempting to mount the specified logical unit including the file written by the block access processing,
   if the mount operation has been successfully completed, the block access processing unit is configured to set the third information to a value indicating that the iSCSI session has not been established, to set the fifth information to a value indicating that the specified logical unit is mounted, and to create a replication of the specified logical unit to set the replicated logical unit as the logical unit for file access.

3. The storage device according to claim 1, wherein the block access processing unit is configured to prohibit any file access to the specified logical unit during the block access processing.

4. The storage device according to claim 3 wherein the block access processing unit, during processing the block access request, is configured to set the fourth information to a value indicating that the file access to the specified logical unit is not possible to prohibit any file access to the specified logical unit.

5. A controlling method for a storage device comprising a communication port configured to communicate with a host computer, a block access processing unit configured to process a block access request which is an input request per block from the host computer, a memory configured to store session management information, and disk devices comprising multiple logical units, the method comprising the steps of:
   managing, in the memory, the session management information including: (i) first information which indicates user IDs for identifying users of the host computer, (ii) second information which indicates logical units accessible by a user identified by one of the user IDs, (iii) third information which indicates whether an iSCSI session corresponding to the logical units is established, (iv) fourth information which indicates whether file accesses to the logical units are possible by the user identified by the one of the user IDs and (v) fifth information which indicates whether the logical units are already mounted;
   receiving, via the communication port, a login request for block access according to the iSCSI protocol from the host computer; and
   in response to the login request for block access, using, via the block access processing unit, the session management information to specify a logical unit as an access target;
   unmounting, via the block access processing unit, the specified logical unit;
   setting, via the block access processing unit, the third information to a value indicating that the iSCSI session has been established and setting, via the block access processing unit, the fifth information to a value indicating that the specified logical unit is not mounted to perform a block access processing;
   receiving, via the communication port, a logout request for block access according to the iSCSI protocol;
   determining, via the block access processing unit, whether a mount operation has been successfully completed by attempting to mount the specified logical unit including a file written by the block access processing;

if the mount operation has been successfully completed, changing, via the block access processing unit, the third information to a value indicating that the iSCSI session has not been established, and changing, via the block access processing unit, the fifth information to a value indicating that the specified logical unit is mounted to put the specified logical unit in a state where file access is possible; and, if the mount operation has not been successfully completed, maintaining, via the block access processing unit, the third information at the value indicating that the iSCSI session has been established and the fifth information at the value indicating that the specified logical unit is not mounted.

6. The controlling method according to claim 5, further comprising:

during processing of the block access request, setting, via the block access processing unit, the fourth information to a value indicating that file access to the specified logical unit is not possible, to prohibit any file access to the specified logical unit.

7. The controlling method according to claim 5, wherein putting the specified logical unit in a state where file access is possible comprises creating, via the block access processing unit, a replication of the specified logical unit to set the replicated logical unit as the logical unit for file access.

* * * * *